(12) United States Patent
Weingarten (10) Patent No.: US 11,144,077 B2
(45) Date of Patent: Oct. 12, 2021

(54) PRESSURE REDUCING VALVE WITH SHUT OFF

(71) Applicant: BERMAD CS LTD., Kibbutz Evron (IL)

(72) Inventor: Zvi Weingarten, Kibbutz Evron (IL)

(73) Assignee: BERMAD CS LTD., Kibbutz Evron (IL)

(*) Notice: Subject to any disclaimer, the term of this patent is extended or adjusted under 35 U.S.C. 154(b) by 28 days.

(21) Appl. No.: 16/491,174

(22) PCT Filed: Mar. 5, 2018

(86) PCT No.: PCT/IL2018/050246
§ 371 (c)(1),
(2) Date: Sep. 5, 2019

(87) PCT Pub. No.: WO2018/163161
PCT Pub. Date: Sep. 13, 2018

(65) Prior Publication Data
US 2020/0026313 A1     Jan. 23, 2020

Related U.S. Application Data

(60) Provisional application No. 62/467,145, filed on Mar. 5, 2017.

(51) Int. Cl.
*F16K 31/12* (2006.01)
*G05D 16/10* (2006.01)
*G05D 16/16* (2006.01)

(52) U.S. Cl.
CPC ......... *G05D 16/103* (2013.01); *G05D 16/163* (2013.01); *Y10T 137/7782* (2015.04); *Y10T 137/7808* (2015.04)

(58) Field of Classification Search
CPC ............... G05D 16/103; G05D 16/106; G05D 16/2095; Y10T 137/7808
See application file for complete search history.

(56) References Cited

U.S. PATENT DOCUMENTS

| | | | |
|---|---|---|---|
| 6,374,853 B1* | 4/2002 | Callies | G05D 16/0608 137/495 |
| 8,678,029 B2* | 3/2014 | Ungerecht | F16K 1/123 137/505.25 |
| 2011/0174394 A1* | 7/2011 | Kristoffersen | G05D 7/005 137/505 |
| 2019/0163210 A1* | 5/2019 | Duffin | G05D 16/0661 |

* cited by examiner

*Primary Examiner* — Robert K Arundale
(74) *Attorney, Agent, or Firm* — Mark M. Friedman (57) ABSTRACT

A pressure reducing valve (IOO) includes a displaceable throttling element (51) displaceable between a fully-open position in which fluid flows along a flow path from an inlet (11) to an outlet (45), and a closed position in which the flow path is blocked. A spring (6) acts to displace the displaceable throttling element to the fully-open position while pressure within a control chamber (54) acts on a pressure-actuated surface to displace the displaceable throttling element towards the closed position. A switchable hydraulic control circuit in fluid connection with the inlet, the outlet and the control chamber, is switchable between first state in which a pressure within the control chamber is equalized with the outlet pressure, and a second state in which the pressure within the control chamber is equalized with an inlet pressure.

4 Claims, 6 Drawing Sheets

PRESSURE REDUCING VALVE WITH SHUT OFF

FIELD AND BACKGROUND OF THE INVENTION

The present invention relates to a pressure reducing valve and, in particular, it concerns a pressure reducing valve with a shut-off function.

It is known to provide pressure reducing valves to regulate the pressure provided to a device, particularly for devices which have specific pressure supply requirements for proper operation. One example of such a device is a sprinkler system. In various cases, it is also necessary to provide electrically controllable on/off switching functionality.

SUMMARY OF THE INVENTION

The present invention is a pressure reducing valve with a shut-off function.

According to the teachings of an embodiment of the present invention there is provided, a pressure reducing valve comprising: (a) a valve assembly defining a flow path from an inlet to an outlet; (b) a throttling arrangement forming part of the flow path, the throttling arrangement comprising a displaceable throttling element displaceable between a fully-open position in which the flow path is open and a closed position in which the flow path is substantially blocked; (c) a spring acting to displace the displaceable throttling element to the fully-open position; (d) a control chamber including at least one pressure-actuated surface mechanically associated with the displaceable throttling element such that pressure within the control chamber acts to displace the displaceable throttling element against the spring towards the closed position; and (e) a switchable hydraulic control circuit in fluid connection with the inlet, the outlet and the control chamber, the switchable hydraulic control circuit assuming: (i) a first state in which a pressure within the control chamber is equalized with an outlet pressure, and (ii) a second state in which the pressure within the control chamber is equalized with an inlet pressure.

According to a further feature of an embodiment of the present invention, the hydraulic control circuit is electrically actuated to switch between the first and second states.

According to a further feature of an embodiment of the present invention, switching of the hydraulic control circuit between the first and second states is achieved via a three-port pilot valve.

According to a further feature of an embodiment of the present invention, switching of the hydraulic control circuit between the first and second states is achieved via a two-port on/off pilot valve.

According to a further feature of an embodiment of the present invention, the hydraulic control circuit comprises a flow restriction deployed within a control circuit flow path interconnecting between the fluid connection to the inlet and the control chamber, and wherein the on/off valve controls a fluid interconnection between the control chamber and the fluid connection to the outlet.

According to a further feature of an embodiment of the present invention, the flow restriction is implemented as a labyrinth.

According to a further feature of an embodiment of the present invention, the control circuit flow path includes, sequentially, a filter configuration, a stilling chamber and the labyrinth.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a pressure reducing valve with a shut-off function.

The principles and operation of valves according to the present invention may be better understood with reference to the drawings and the accompanying description.

Referring collectively to the drawings, a pressure reducing valve 100 includes a valve assembly defining a flow path from an inlet 11 to an outlet 45. A throttling arrangement forms part of the flow path. The throttling arrangement includes a displaceable throttling element (piston tube 51) displaceable between a fully-open position (to the right as shown) in which the flow path is open and a closed position (displaced to the left) in which the flow path is substantially blocked by closing of the displaceable throttling element against a seal plug 2. The phrase "substantially blocked" in this context typically refers to blocking sufficient to reduce any residual flow by at least two orders of magnitude relative to the flow rate when the valve is fully open. A spring 6 acts to bias the displaceable throttling element to the fully-open position. A control chamber 54 includes at least one pressure-actuated surface (right side of a piston 5) mechanically associated with the displaceable throttling element such that pressure within the control chamber 54 acts to displace the displaceable throttling element against the bias of spring 6 towards the closed position.

The valve is preferably remotely switchable by changing the state of a switchable hydraulic control circuit that is in fluid connection with the inlet 11, the outlet 45 and the control chamber 54. The switchable hydraulic control circuit assumes:

(i) a first state in which a pressure $P_C$ within the control chamber is equalized with an outlet pressure $P_2$, and
(ii) a second state in which the pressure within the control chamber $P_C$ is equalized with an inlet pressure $P_1$.

When $P_C=P_2$, throttling occurs in a manner known for direct acting pressure reduction valves, balancing the output pressure against the force of the spring in order to maintain the output pressure around a predetermined value, and without requiring external control or actuation.

When $P_C=P_1$, the full inlet pressure is applied to displace the displaceable throttling element towards its fully closed position, overcoming the bias of spring 6 and thereby blocking the flow and switching the valve "off". Where full sealing is required, an elastomer seal 22 may be provided to ensure complete sealing on closure. In applications where slow leakage through the valve is acceptable for the "off" state, closure of the rigid elements against each other may be sufficient.

The use of a single control chamber 54 for both the pressure reduction regulation and for the valve closure function renders the proposed valve structures particularly compact and structurally simple.

Figure 1:
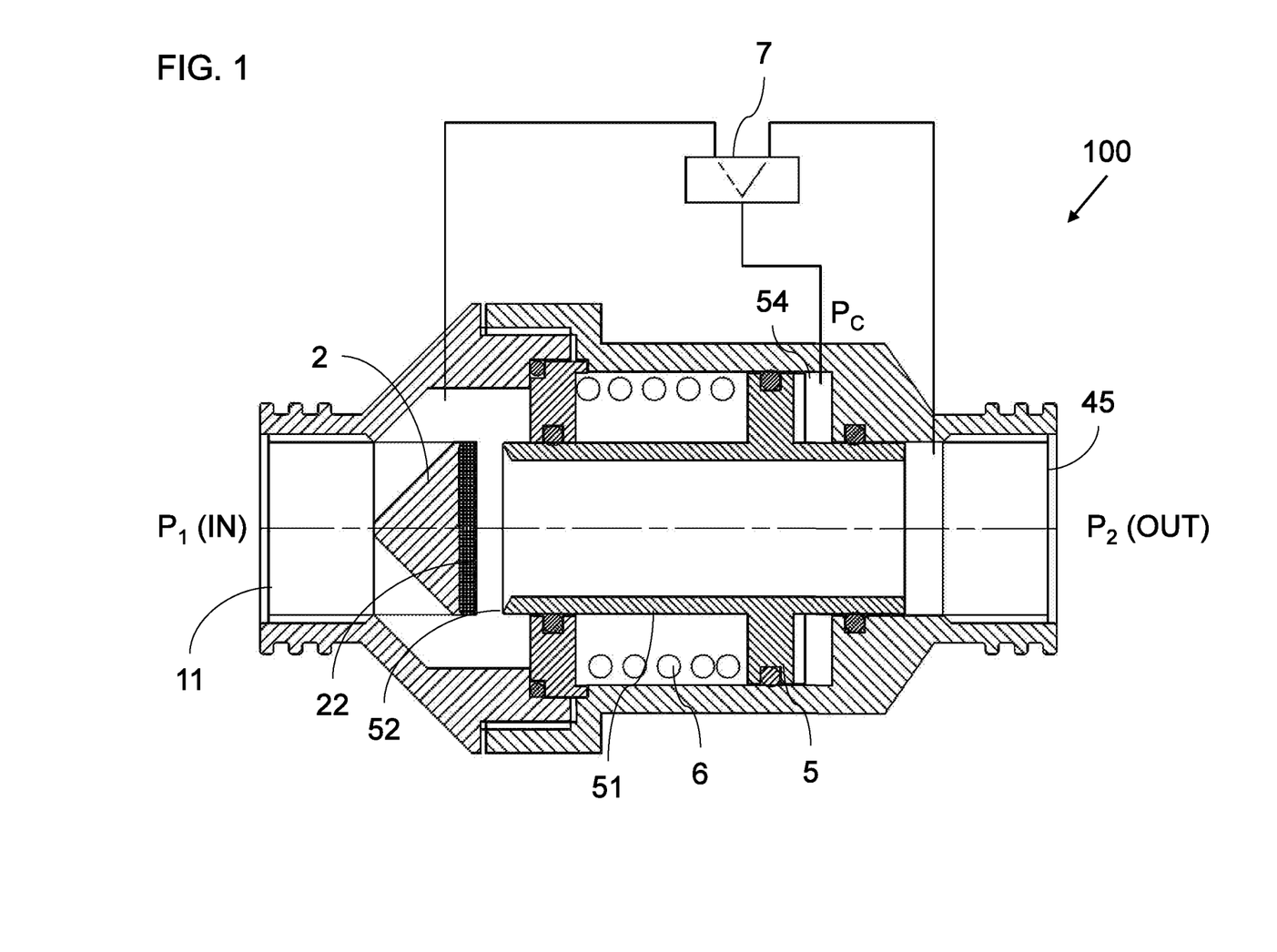
FIG. 1 is a schematic representation of a first implementation of a pressure reducing valve, constructed and operative according to an embodiment of the present invention, employing a three-way pilot valve.

Switching of the hydraulic control circuit is most preferably electrically actuated, typically by use of a solenoid-controlled pilot valve, to switch between the first and second states. According to a first option, illustrated schematically in FIG. 1, switching is performed directly by use of a three-port pilot valve 7 which alternately connects the control chamber 54 to either the outlet pressure or the inlet pressure. The switching is actuated by suitable control circuitry, forming part of a control system (not shown), as is well known in the art, and may include a local or otherwise hard-wired controller including circuitry and/or one or more processor configured for implementing a preset switching schedule, or to work together with other sensors or control components as part of a more complex control system. Additionally or alternatively, the control system may include communication components for linking the controller to a local-area network and/or a wide-area network for implementing remote control of the valve from another location in the network, either automatically or manually. The control system of the present invention is essentially similar to that used in conventional systems, and will therefore not be described herein in further detail.

Figure 2:
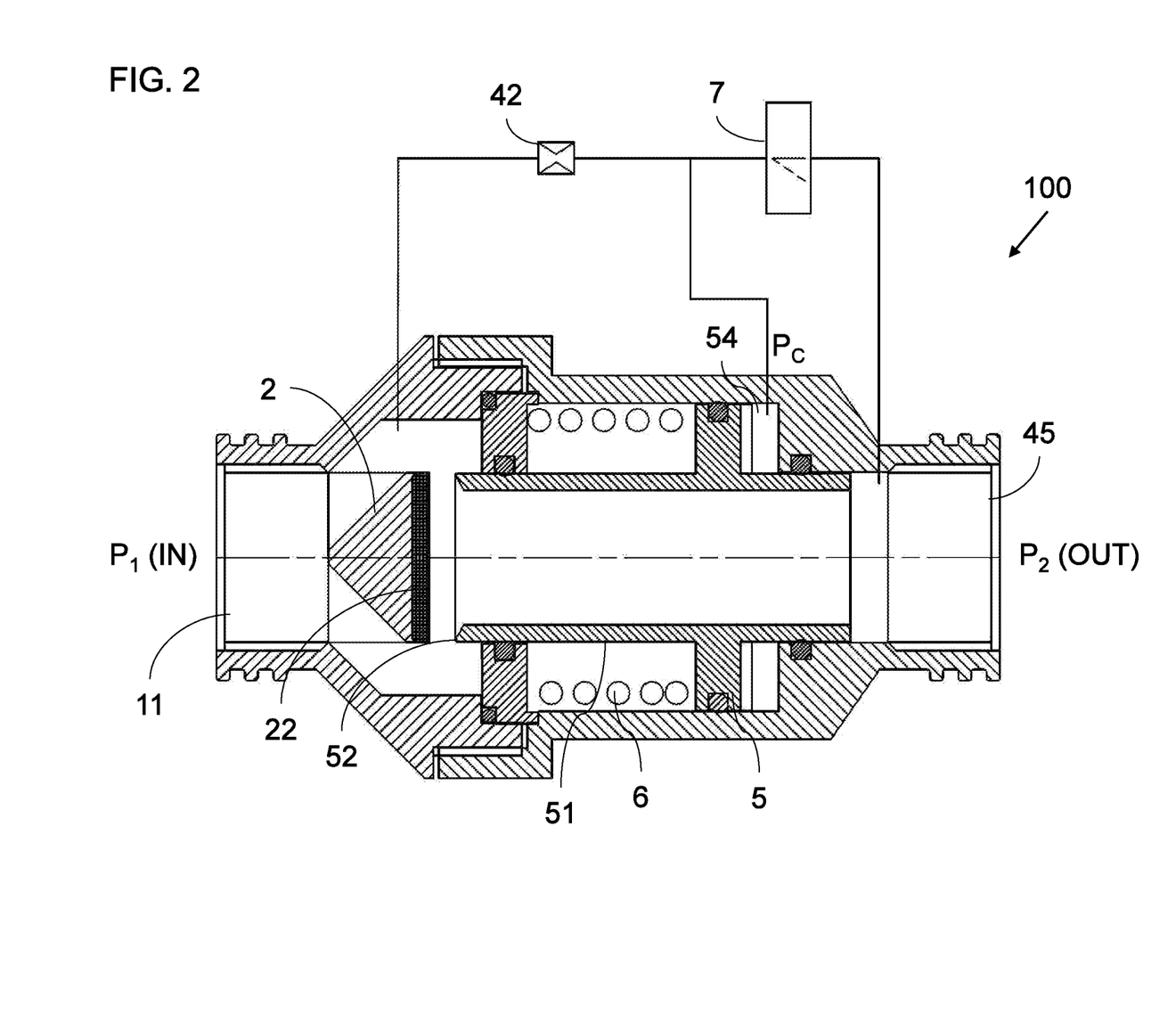
FIG. 2 is a schematic representation of a variant implementation of a pressure reducing valve, constructed and operative according to an embodiment of the present invention, employing a two-way pilot valve.
Figure 3:
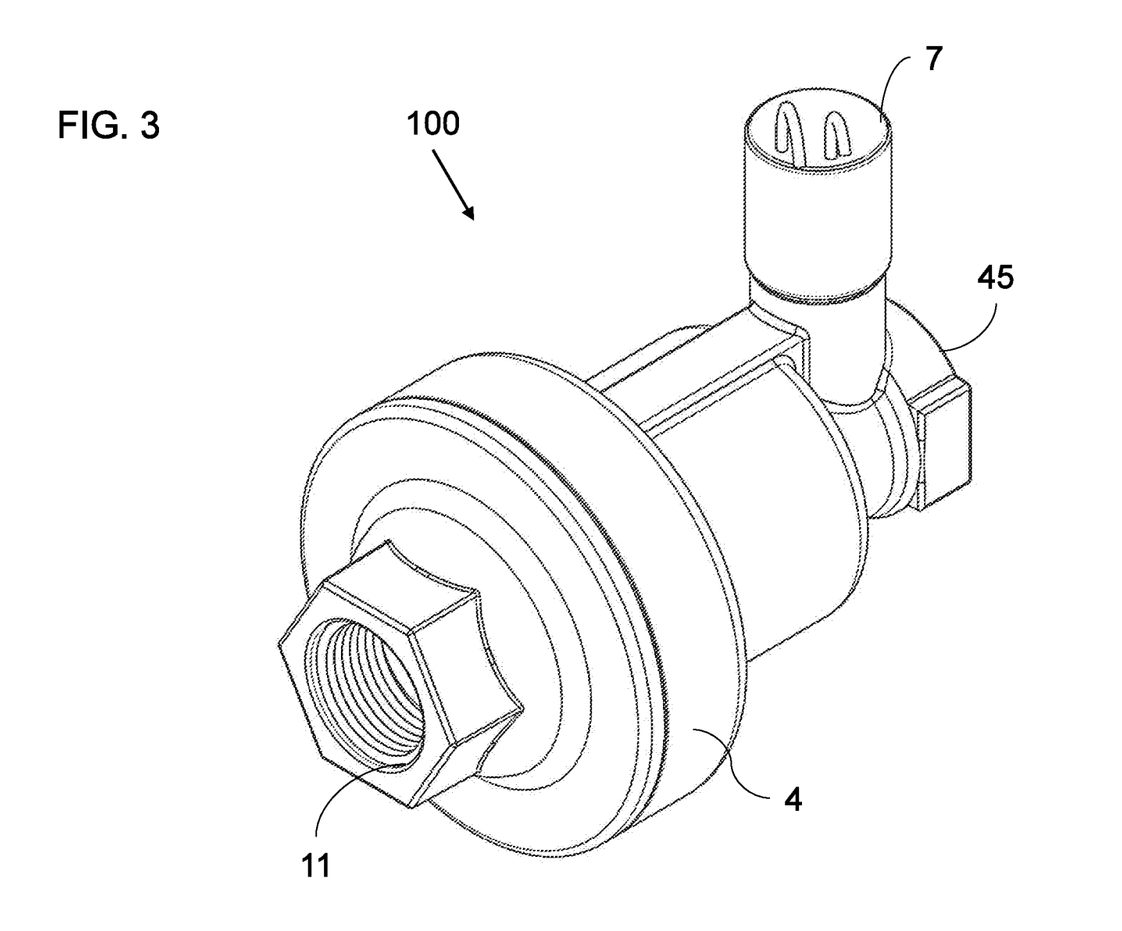
FIG. 3 is an isometric view of a pressure reducing valve, constructed and operative according to an embodiment of the present invention, employing a three-way pilot valve.

According to a further, particularly preferred option illustrated schematically in FIG. 2, and in a more detailed exemplary embodiment in FIGS. 3-5B, switching of the hydraulic control circuit between the first and second states is achieved via a two-port on/off pilot valve 71, thereby rendering the pilot valve and pilot valve actuator particularly simple, reliable and low-cost. The operational principle of the hydraulic control circuit according to this approach is best understood with reference to FIG. 2.

Specifically, the hydraulic control circuit as shown here includes a flow restriction 42 deployed within a control circuit flow path interconnecting between the fluid connection to the inlet 11 and the control chamber 54, while the on/off valve 7 controls a fluid interconnection between the control chamber 54 and the fluid connection to the outlet 45. As a result, when the valve is open, the hydraulic control loop defines an open loop flow from a region of inlet pressure to a region of outlet pressure. Since the flow restriction 42 is designed to be the primary flow impedance in that loop, the flow through the control loop stabilizes at a (very small) flow rate when the pressure drop across the flow restriction is substantially equal to the pressure difference between the inlet and the outlet. ("Substantially equal" in this context refers to following of the pressure difference sufficient to provide the recited pressure regulating effect, but does not exclude the possibility of some degree of lag in approaching pressure equalization and/or some residual pressure difference on a scale of up to about 5% of the pressure difference between the inlet and outlet pressures.) As a result, control chamber 54, located downstream of the flow restriction, is effectively maintained at outlet pressure $P_2$, thereby providing the desired pressure reduction regulation functionality.

When the pilot valve 7 is switched to its flow-interrupting state, preventing flow to the outlet region, pressure within the now dead-end hydraulic control loop circuit quickly equalizes across the flow restriction, thereby bringing pressure $P_C$ within control volume 54 to inlet pressure $P_1$, resulting in cutting-off of the flow, as described above.

It would be possible to achieve a similar result using a reversed arrangement where the flow restriction 42 would be located in the flow path between control volume 54 and the outlet, and the two-port pilot valve would be deployed in the flow path between the inlet and the control volume. In this reversed arrangement, it would be the open state of the control valve which would correspond to the "off" state of the valve, and the control loop would generate a slow leakage across the valve via the flow restriction 42. For this reason, it is generally considered preferable to have the configuration as illustrated here, where the flow restriction is upstream of the control volume, and the valve is downstream.

Although illustrated herein in a non-limiting example of a three-port or two-port solenoid-actuated pilot valve, it will be clear that other pilot valve control modalities may be used to implement the invention, such as for example, a hydraulically actuated pilot valve, or a manually-switchable control valve.

Exemplary Preferred Embodiment

Further details of a particularly preferred exemplary implementation of a valve according to the operating principles of FIG. 2 are illustrated in FIGS. 3-7. In this case, the flow restriction is implemented as a labyrinth 42, and the control circuit flow path includes, sequentially, a filter configuration provided by a set of slots 24, a stilling chamber 25 to reduce turbulence in water that has passed the filter and to allow settling of any solids before reaching the labyrinth, and the labyrinth 42.

Figure 4:
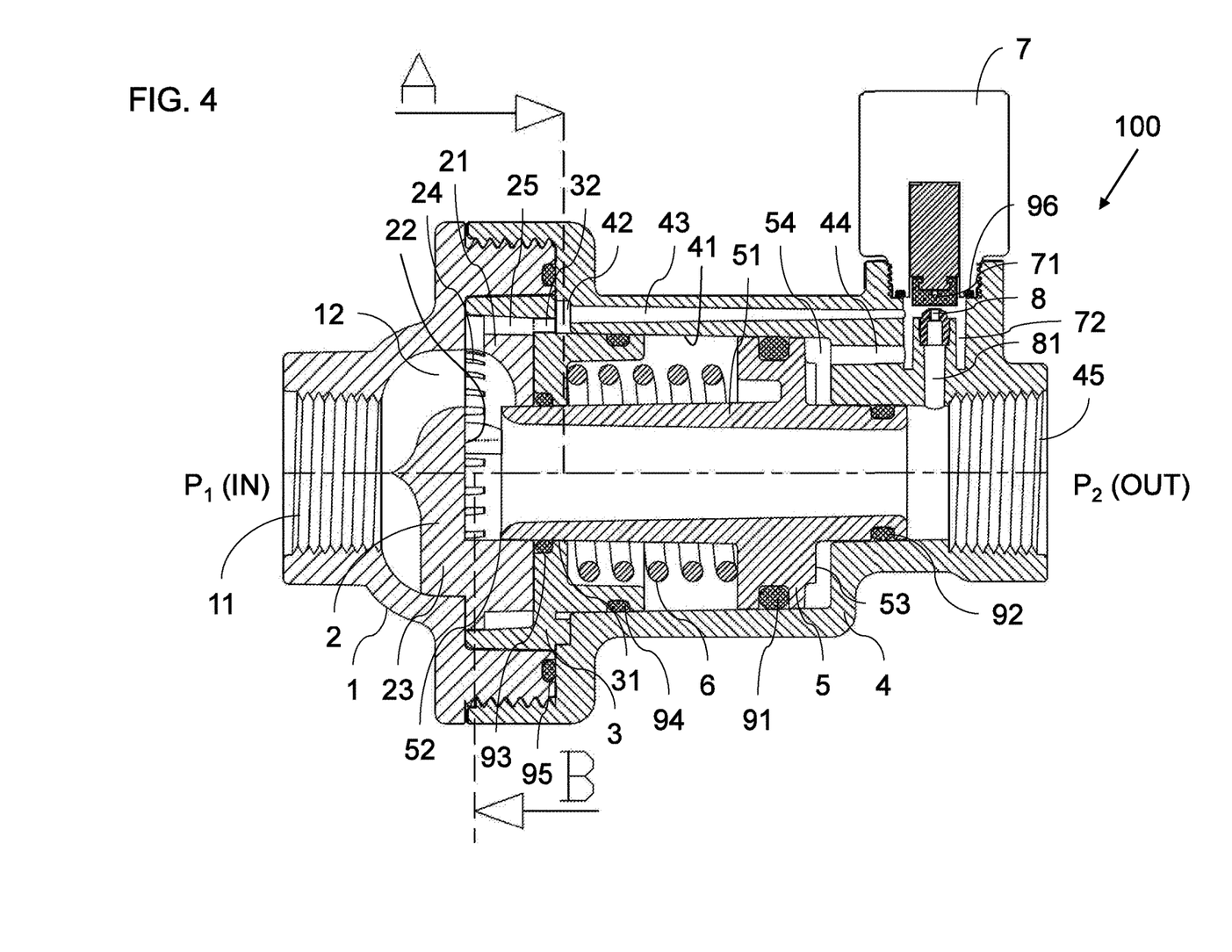
FIG. 4 is an axial cross-sectional view taken along a central axis of the valve of FIG. 3 from the inlet to the outlet.

Referring particularly to FIG. 4, the outer casing of valve 100 here is formed primarily from a valve closure 1, providing threaded inlet 11, which is in threaded engagement with a valve base 4, which provides threaded outlet 45. Pressure regulation is achieved by a sliding motion of a piston 5 which slides in sealing contact with a cylinder 41 of base 4, sealed by an O-ring 91. Motion of the piston 5 is governed by the balance of forces between the pressure in a control chamber 54 acting against force in a spring element 6, preferably a helical compression spring.

Throttling of flow through valve 100 is achieved by sliding motion of a closing edge (rim) 52 of a piston tube 51 integrated with piston 5, as the rim moves towards and away from a closure surface 22 (optionally a resilient seal) of seal plug 2. Seal plug 2 is held in place by a number of ribs 23 which suspend the seal plug relative to a flow-guiding ring 21 which forms part of flow pathways 12 from inlet 11 to the piston cylinder 41.

Figure 5:
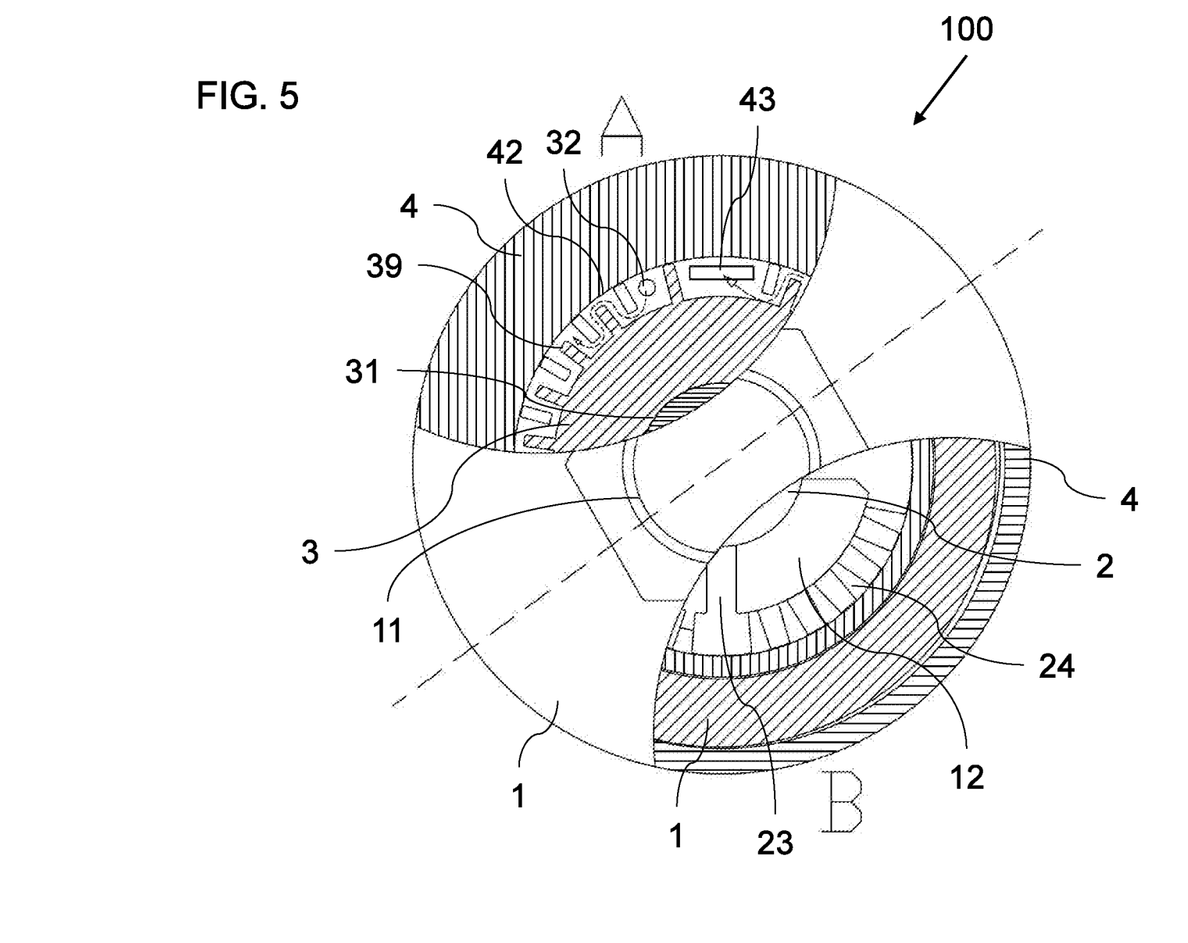
FIG. 5 is an axial view of the valve of FIG. 3 taken along the inlet axis, with partial cross-sectional views in regions labeled 'A' and 'B' taken along lines 'A' and 'B' of FIG. 4.
Figures 6, 7:
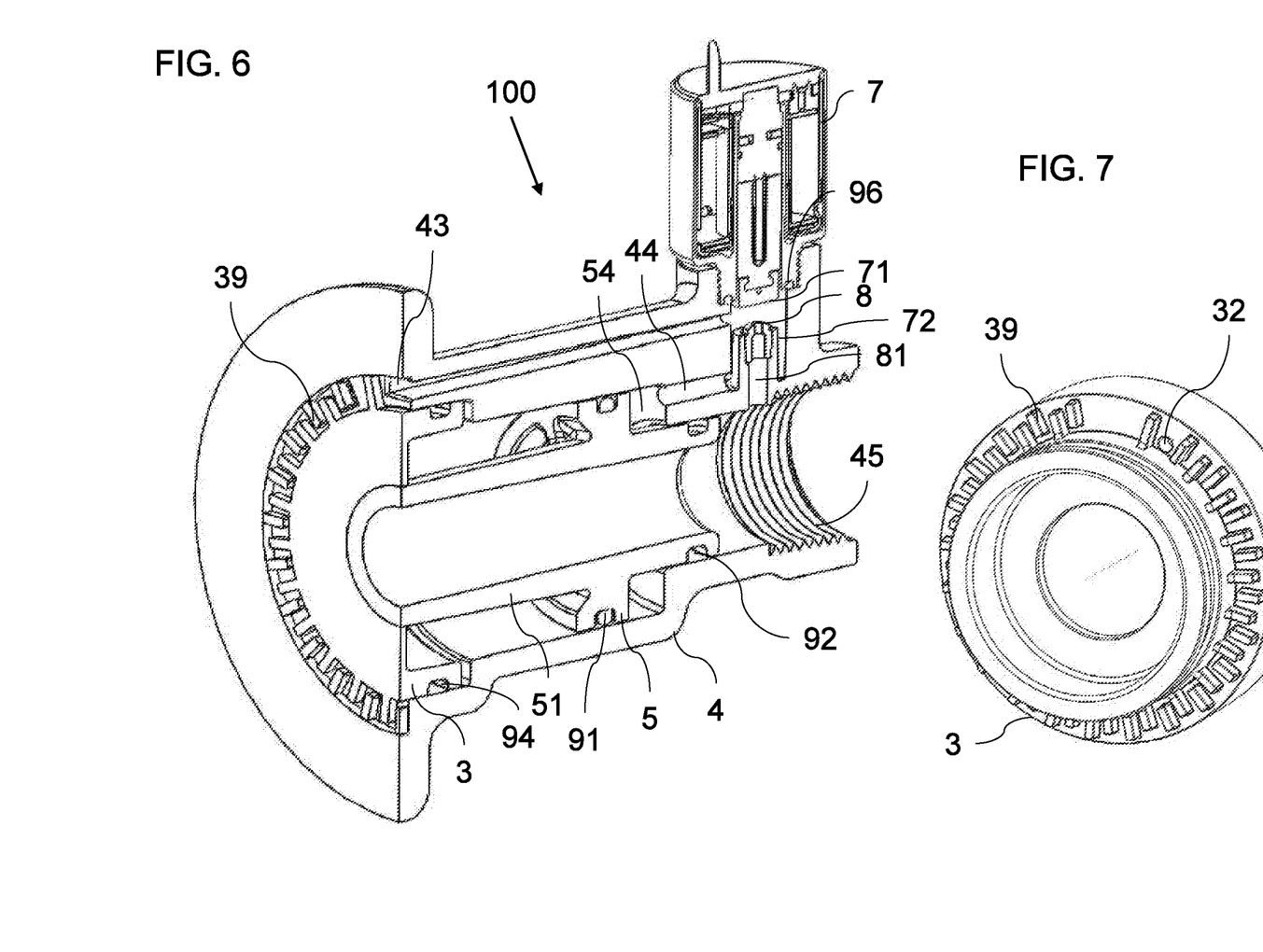
FIG. 6 is an isometric cut-away view of the valve of FIG. 3 cut away along both a central axial plane between the inlet and the outlet and along the line denoted 'A' in FIG. 4.
FIG. 7 is an isometric view of a labyrinth bracket from the valve of FIG. 3, viewed from a downstream side of the bracket.

In order to feed inlet pressure to the control loop, a number of filter slots 24 formed in flow-guiding ring 21 allow egress of a small filtered part of the flow to an annular stilling chamber 25, where turbulence is reduced and any small entrained solid particles tend to settle. Water is fed from stilling chamber 25 via a flow passage 32 to the inlet of a labyrinth 42. The labyrinth is shown here formed by a series of baffles 39 supported by a labyrinth bracket 3 so as to abut adjacent surfaces of valve base 4, as best seen in FIGS. 5 (region 'A'), 6 and 7, so as to define a long, thin meandering flow path extending annularly around the valve structure. FIG. 7 shows labyrinth bracket 3 from the downstream side. An elongated passageway 43 through valve body 4 defines an outlet from labyrinth 42 which connects via the solenoid valve chamber 72 and a connecting passageway 44 to control chamber 54. Solenoid valve chamber 72 is also connected via solenoid valve orifice 8 and drain passage 81 to outlet flow path near outlet 45. Solenoid plunger 71 is selectively displaced by the solenoid to either open or seal orifice 8.

A set of O-ring seals 91, 92, 93, 94, 95 and 96 provide seals between the various components, where seals 91, 92 and 93 are sliding seals and seals 94, 95 and 96 are static seals. A vent hole (not shown) preferably allows venting of the volume containing spring 6 to the atmosphere.

Operation of Preferred Embodiment

Water flow enters the valve inlet 11, flows through piston tube 51 and exits the valve via outlet 45. During normal open-flow operation, the upstream pressure $P_1$ is throttled down to a desired output pressure as water flows through the passageway between the plug seal 22 and the piston closure 52 (rim). A preset force from spring 6 drives the piston 5 to open the valve, which is balanced by the downstream pressure $P_2$ acting on piston 5 to close the valve.

The pressure regulation is attained as the spring 6 force and the piston 5 force reach equilibrium. Should the downstream pressure $P_2$ rise, piston 5 force prevails over the spring 6 load, and the valve throttles down the downstream $P_2$ pressure, and vice versa.

Control Flow Loop Operation

The control loop flow starts as the water enters the narrow and outwardly-fanned slots 24 which act as a coarse filter. From filter slots 24, water enters the stilling chamber 25, then passing through passageway 32 into labyrinth 42, across which the pressure drops from the upstream pressure $P_1$ to the downstream $P_2$ (preset) pressure.

Labyrinth 42 defines a long and turbulent flow pathway F which achieves the required pressure reduction using a relatively large channel (compared to an equivalent flow impedance achieved using a capillary flow restriction), thereby minimizing risks of clogging. From labyrinth 42, the water flows through elongated passageway 43 into solenoid chamber 72 and to the control chamber 54 via passageway 44. Piston stopping ribs 53 ensure that control chamber 54 is never completely emptied.

As long as solenoid plunger 71 remains in its withdrawn, open position, away from orifice 8, the water will bleed to the downstream outlet duct 45 via orifice drain passage 81. so that the pressure at the solenoid chamber 72 and control chamber 54 drops to the downstream pressure $P_2$. Valve 100 then regulates the pressure $P_2$ as described above.

When solenoid plunger 71 is actuated to close orifice 8, water flow through the control loop stops, and the pressure at solenoid chamber 72 and control chamber 54 rises from the dynamic downstream $P_2$ to the static upstream $P_1$ pressure. Thus the force on piston 5 increases beyond that of the regulation mode, and the valve is driven to its closed position, when the closure 52 is pressed against the plug seal 22.

LIST OF NOMENCLATURE

1 Valve closure
2 Seal plug
3 Labyrinth bracket
4 Valve body
5 Piston
6 Spring
7 Solenoid pilot valve
8 Solenoid valve orifice
11 Valve inlet duct
12 Valve inlet pathways
21 Flow-guiding ring
22 Plug seal, optionally with resilient plug seal (not shown)
23 Rib
24 Filter slot
25 Stilling chamber
31 Piston guide
32 Flow passage
39 Baffles
41 Piston's cylinder
42 Labyrinth
43 Elongated passageway
44 Connecting passageway
45 Valve exit conduit
51 Piston tube
52 Closure (piston tube rim)
53 Piston stopping ribs
54 Control chamber
71 Solenoid plunger
72 Solenoid valve chamber
81 Solenoid orifice drain passage
91, 92, 93, 94, 95, 96 O-Ring seals
$P_1$ Upstream (inlet) pressure
$P_2$ Downstream (outlet) pressure Although described and illustrated above in the context of a piston-based implementation, it will be immediately clear to a person having ordinary skill in the art that control chamber 54 may alternatively be implemented using a diaphragm-based structure, where the control pressure $P_C$ acts on a diaphragm that is mechanically linked with the displaceable throttling element. The principles of operation, and details of the hydraulic control loop, remain as described above.

It will be appreciated that the above descriptions are intended only to serve as examples, and that many other embodiments are possible within the scope of the present invention as defined in the appended claims.

What is claimed is:

1. A pressure reducing valve comprising:
   (a) a valve assembly defining a flow path from an inlet to an outlet;
   (b) a throttling arrangement forming part of said flow path, said throttling arrangement comprising a displaceable tube having a rim, said displaceable tube being displaceable relative to a closure surface of a plug between a fully-open position in which said rim is spaced from said closure surface so that said flow path is open, said flow path passing between said rim and said closure surface and through said displaceable tube, and a closed position in which said rim closes against said closure surface so that said flow path is substantially blocked;
   (c) a spring acting to displace said displaceable tube to said fully-open position;
   (d) a control chamber including at least one pressure-actuated piston surface integrated with said tube such that pressure within said control chamber acts to displace said displaceable tube against said spring towards said closed position; and (e) a switchable hydraulic control circuit in fluid connection with said inlet, said outlet and said control chamber, said switchable hydraulic control circuit assuming:
  (i) a first state in which a pressure within said control chamber is equalized with an outlet pressure, such that a balance between the control chamber pressure and the force of said spring achieves outlet pressure regulation, and
  (ii) a second state in which the pressure within said control chamber is equalized with an inlet pressure, thereby overcoming the force of said spring to close the valve,
wherein said hydraulic control circuit comprises a flow restricting labyrinth deployed within a control circuit flow path interconnecting between said fluid connection to said inlet and said control chamber, and wherein switching of said hydraulic control circuit between said first and second states is achieved via a two-port on/off pilot valve controlling a fluid interconnection between said control chamber and said fluid connection to said outlet.

2. The pressure reducing valve of claim 1, wherein said hydraulic control circuit is electrically actuated to switch between said first and second states.

3. The pressure reducing valve of claim 1, wherein said control circuit flow path includes, sequentially, a filter configuration, a stilling chamber and said labyrinth.

4. The pressure reducing valve of claim 1, wherein said labyrinth defines a meandering flow path extending annularly around the valve.

\* \* \* \* \*